United States Patent
Kameyama (10) Patent No.: US 10,873,282 B2
(45) Date of Patent: Dec. 22, 2020

(54) MOTOR CONTROL APPARATUS FOR DETECTING STOP POSITION OF ROTOR OF MOTOR AND IMAGE FORMING APPARATUS

(71) Applicant: CANON KABUSHIKI KAISHA, Tokyo (JP)

(72) Inventor: Shigeru Kameyama, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/400,196

(22) Filed: May 1, 2019

(65) Prior Publication Data
US 2019/0356252 A1 Nov. 21, 2019

(30) Foreign Application Priority Data
May 16, 2018 (JP) ................. 2018-094754

(51) Int. Cl.
*H02P 6/18* (2016.01)
*H02P 6/182* (2016.01)
*G03G 15/00* (2006.01)
*H02P 6/24* (2006.01)

(52) U.S. Cl.
CPC ......... *H02P 6/186* (2013.01); *G03G 15/5008* (2013.01); *G03G 15/80* (2013.01); *H02P 6/182* (2013.01); *H02P 6/24* (2013.01)

(58) Field of Classification Search
CPC .................................. H02P 6/186; H02P 6/182
USPC ................................................ 318/490, 34
See application file for complete search history.

(56) References Cited

U.S. PATENT DOCUMENTS

| 5,493,188 A * | 2/1996 | Yoshikawa | H02P 6/24 318/400.09 |
| 6,577,092 B2 * | 6/2003 | Okai | H02P 6/24 318/280 |
| 7,498,760 B2 * | 3/2009 | Akiyama | G05B 19/33 318/609 |
| 8,698,438 B2 * | 4/2014 | Mori | H02P 8/36 236/67 |
| 9,431,940 B2 | 8/2016 | Kameyama | |

(Continued)

FOREIGN PATENT DOCUMENTS

| JP | 2004336865 A | 11/2014 |
| JP | 2015104263 A | 6/2015 |
| JP | 2016082615 A | 5/2016 |

OTHER PUBLICATIONS

Unpublished, copending U.S. Appl. No. 16/440,118 to Shigeru Kameyama, filed Jun. 13, 2019.

*Primary Examiner* — David Luo
(74) *Attorney, Agent, or Firm* — Venable LLP (57) ABSTRACT

A motor control apparatus includes: a voltage control unit configured to control a voltage applied to a plurality of coils in a motor to supply an exciting current; a current detection unit configured to detect an exciting current having flown through the plurality of coils; and a detection unit configured to detect a stop position of a rotor of the motor by performing a detection process, in which the exciting current to at least a first coil of the plurality of coils is supplied by the voltage control unit, and the exciting current is detected by the current detection unit. The detection process includes a first period in which a first voltage of a first polarity is applied to the first coil, and a second period in which a second voltage of a second polarity is applied to the first coil.

19 Claims, 11 Drawing Sheets

(56) References Cited

U.S. PATENT DOCUMENTS

2015/0145454 A1 5/2015 Kameyama
2019/0173402 A1 6/2019 Kameyama

* cited by examiner

| TIME | #1 | #2 | #3 | #4 | #5 | #6 | #7 |
|---|---|---|---|---|---|---|---|
| t0 | 0 | 0 | 0 | 0 | 0 | 0 | 0 |
| t1 | 12 | 8 | 7 | 7 | 3 | 3 | 2 |
| t2 | 24 | 16 | 15 | 13 | 7 | 6 | 4 |
| t3 | 36 | 24 | 22 | 20 | 11 | 9 | 6 |
| t4 | 47 | 32 | 29 | 26 | 14 | 11 | 8 |
| t5 | 56 | 38 | 35 | 31 | 17 | 14 | 10 |
| t6 | 64 | 44 | 40 | 36 | 20 | 16 | 12 |
| t7 | 71 | 49 | 44 | 40 | 22 | 17 | 13 |
| t8 | 76 | 52 | 47 | 42 | 23 | 19 | 14 |
| t9 | 79 | 54 | 49 | 44 | 24 | 19 | 14 |
| t10 | 80 | 55 | 50 | 45 | 25 | 20 | 15 |
| t11 | 79 | 54 | 49 | 44 | 24 | 19 | 14 |
| t12 | 76 | 52 | 47 | 42 | 23 | 19 | 14 |
| t13 | 71 | 49 | 44 | 40 | 22 | 17 | 13 |
| t14 | 64 | 44 | 40 | 36 | 20 | 16 | 12 |
| t15 | 56 | 38 | 35 | 31 | 17 | 14 | 10 |
| t16 | 47 | 32 | 29 | 26 | 14 | 11 | 8 |
| t17 | 36 | 24 | 22 | 20 | 11 | 9 | 6 |
| t18 | 24 | 16 | 15 | 13 | 7 | 6 | 4 |
| t19 | 12 | 8 | 7 | 7 | 3 | 3 | 2 |
| t20 | 0 | 0 | 0 | 0 | 0 | 0 | 0 |

MOTOR CONTROL APPARATUS FOR DETECTING STOP POSITION OF ROTOR OF MOTOR AND IMAGE FORMING APPARATUS

BACKGROUND OF THE INVENTION

Field of the Invention

The present invention relates to a technique of controlling a motor.

Description of the Related Art

A sensorless DC brushless motor in which a sensor for detecting the rotor position is not mounted is used as a driving source of a rotation member in an image forming apparatus. For sensorless DC brushless motors, the position of the rotor while the motor is stopped (hereinafter referred to as rotor stop position) is detected, and an activation process corresponding to the rotor stop position is performed to avoid problems such as synchronization loss and/or backward rotation upon activation. US-2015-0145454 discloses a configuration in which the rotor stop position is detected based on the exciting current obtained by applying a voltage to a coil for only a short time.

In a typical detection of the rotor stop position, measurement is performed for combinations of a plurality of coils. Here, to correctly detect the rotor stop position, the measurement is required to be started in the state where the exciting current is zero. Consequently, when attenuation of the exciting current is slow, the waiting time until the exciting current becomes zero takes a long time, and accordingly, the detection of the rotor stop position takes a long time.

SUMMARY OF THE INVENTION

According to an aspect of the present invention, a motor control apparatus includes: a voltage control unit configured to control a voltage applied to a plurality of coils included in a motor to supply an exciting current to the plurality of coils; a current detection unit configured to detect an exciting current having flown through the plurality of coils; and a detection unit configured to detect a stop position of a rotor of the motor by performing a detection process, in which the exciting current to at least a first coil of the plurality of coils is supplied by the voltage control unit, and the exciting current is detected by the current detection unit. The detection process includes a first period in which a first voltage of a first polarity is applied to the first coil, and a second period in which a second voltage of a second polarity is applied to the first coil.

Further features of the present invention will become apparent from the following description of exemplary embodiments with reference to the attached drawings.

DESCRIPTION OF THE EMBODIMENTS

Exemplary embodiments of the present invention are described below with reference to the accompanying drawings. Note that, the embodiments described below are merely examples, and the present invention is not limited to the embodiments. In addition, in the drawings, illustration of the components that are not required for the descriptions of the embodiments are omitted.

First Embodiment

Figure 1:
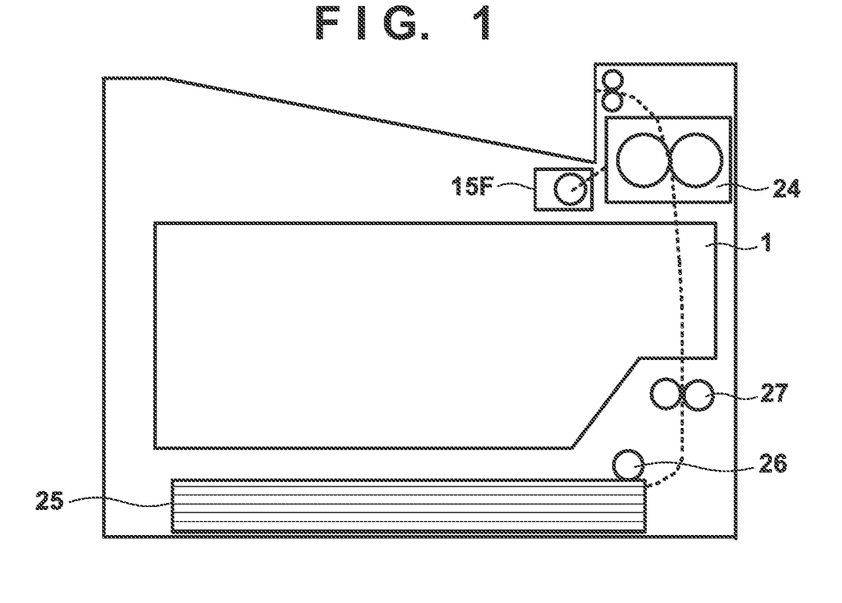
FIG. 1 illustrates a configuration of an image forming apparatus according to an embodiment.

FIG. 1 illustrates a configuration of an image forming apparatus according to the present embodiment. The image forming apparatus may be any of a printing apparatus, a printer, a copier, a multifunctional device, and a facsimile machine, for example. A sheet stored in a sheet feeding cassette 25 of the image forming apparatus is conveyed by a paper feeding roller 26 and a conveyance roller 27 along a conveyance path. An image forming unit 1 forms toner images of yellow, magenta, cyan and black, and transfers the toner images onto a sheet conveyed along the conveyance path. A fixing unit 24 includes a heating roller and a pressure roller, and applies heat and pressure to a sheet on which a toner image has been transferred to fix the toner image on the sheet. A sheet on which the process of fixing a toner image has been performed is ejected out of the image forming apparatus. A motor 15F is a driving source that rotates the roller of the fixing unit 24.

Figure 2:
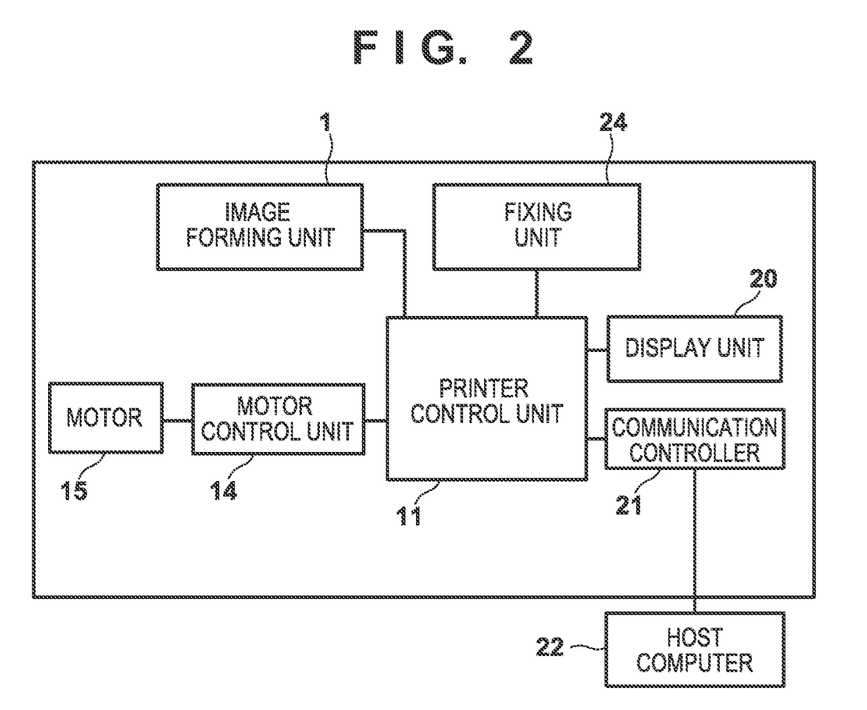
FIG. 2 is a control configuration diagram of the image forming apparatus according to an embodiment.

FIG. 2 illustrates a control configuration of the image forming apparatus. When a printer control unit 11 receives image data of an image to be formed from a host computer 22 via a communication controller 21, the printer control unit 11 controls the image forming unit 1 to form a toner image on a sheet, and controls the fixing unit 24 to fix the toner image on the sheet. In addition, at this time, the printer control unit 11 controls a motor control unit 14 to control each motor 15 including the motor 15F, and performs a conveyance control of sheets and the like. In addition, the printer control unit 11 displays a status of the image forming apparatus on a display unit 20. Note that the printer control unit 11 includes a microcomputer and a memory. The memory stores various control programs and data, and the microcomputer controls components of the image forming apparatus on the basis of the various control programs and data stored in the memory, and the like.

Figure 3:
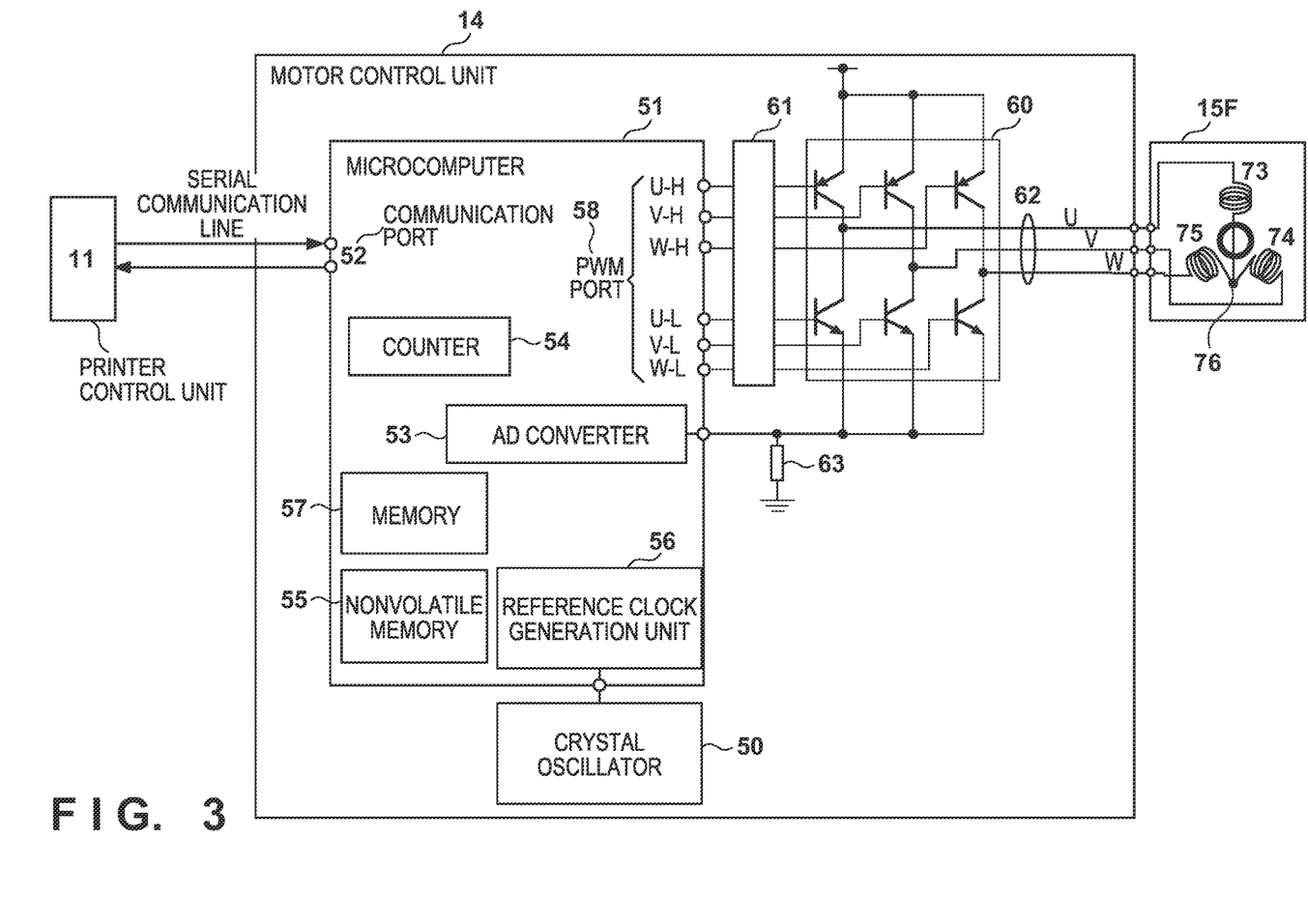
FIG. 3 illustrates a configuration of a motor control unit according to an embodiment.

FIG. 3 illustrates details of a control configuration of the motor 15F. The motor control unit 14 includes a microcomputer 51. The microcomputer 51 communicates with the printer control unit 11 via a communication port 52. In addition, a reference clock generation unit 56 of the microcomputer 51 is connected with a crystal oscillator 50, and generates a reference clock on the basis of an output of the crystal oscillator 50. A counter 54 performs a count operation on the basis of the reference clock. The microcomputer 51 outputs a pulse-width modulation signal (PWM signal) from a PWM port 58. In the present embodiment, the microcomputer 51 outputs six PWM signals in total, namely high-PWM signals (U-H, V-H and W-H) and low-PWM signals (U-L, V-L and W-L) for the three phases (U, V and W) of the motor 15F. For this configuration, the PWM port 58 includes six terminals, U-H, V-H, W-H, U-L, V-L and W-L.

Each terminal of the PWM port 58 is connected with a gate driver 61, and the gate driver 61 performs an ON/OFF control of each switching element of a three-phase inverter 60 on the basis of the PWM signal. Note that, the inverter 60 includes six switching elements in total, namely three high-switching elements of three phases and three low-switching elements of three phases, and the gate driver 61 controls each switching element on the basis of a corresponding PWM signal. A transistor and/or a FET may be used as a switching element, for example. In the present embodiment, when the PWM signal is high, the corresponding switching element is turned ON, and when the PWM signal is low, the corresponding switching element is turned OFF. Outputs 62 of the inverter 60 are connected with coils 73 (U-phase), 74 (V-phase) and 75 (W-phase) of the motor. By controlling ON/OFF of each switching element of the inverter 60, exciting currents of the coils 73, 74, and 75 can be controlled. With this configuration, the microcomputer 51, the gate driver 61 and the inverter 60 function as a voltage control unit for controlling voltages applied to the coils 73, 74, and 75. The exciting current having flown through each of the coils 73, 74, and 75 is converted by a resistance 63 into a voltage, and is input to an AD converter 53 of the microcomputer 51. With this configuration, the resistance 63 and the AD converter 53 serve as a current detection unit. In addition, the microcomputer 51 includes a nonvolatile memory 55 and a volatile memory 57 for storing various types of data for controlling the motor 15F and the like.

Figures 4A, 4B:
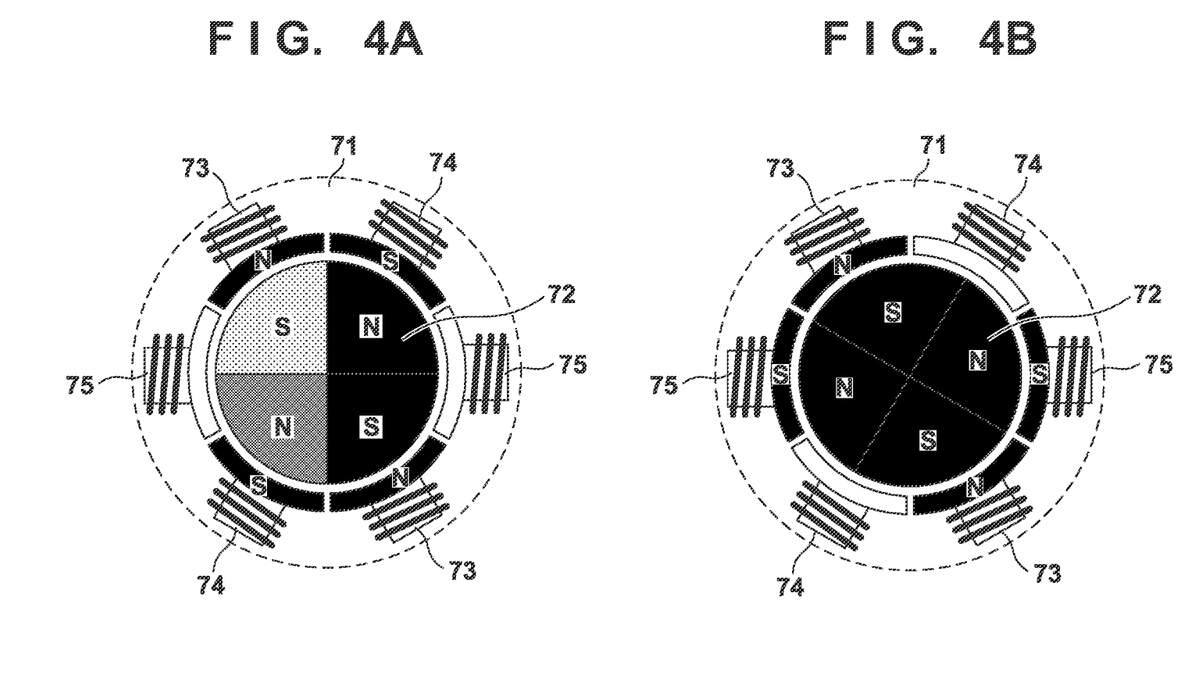
FIGS. 4A and 4B illustrate a configuration of a motor according to an embodiment.

FIG. 4A and FIG. 4B illustrate a configuration of the motor 15F. The motor 15F includes a six-slot stator 71 and a 4-pole rotor 72. The stator 71 includes the coils 73, 74, and 75 of respective phases. The rotor 72 is composed of a permanent magnet, and includes two pairs of N pole and S pole. The stop position of the rotor 72 is determined in accordance with the excitation phase. Note that the excitation phase is represented by the permutation of two coils in the coils 73, 74, and 75. That is, six excitation phases, namely U-V, U-W, V-U, V-W, W-U, and W-V, are provided. Here, the U-V phase means that the exciting current is fed from the coil 73 of the U-phase to the coil 74 of the V-phase via a neutral point 76. For example, when the U-V phase is excited, the rotor 72 stops at the rotation position illustrated in FIG. 4A. Note that, at this time, the U-phase becomes the N pole, and the V-phase becomes the S pole. Subsequently, when the U-W phase is excited, the rotor 72 stops at the rotation position illustrated in FIG. 4B.

When the driving of the motor 15F is stopped and the exciting current is set to 0, the force holding the rotor 72 is eliminated, and the rotor 72 rotates when an external rotational force is applied to the rotor 72. With such a configuration, in some situation, the rotor 72 can rotate when the fixing unit 24 is detached from the image forming apparatus, or when removing a sheet jam from the fixing unit 24. Then, the motor control unit 14 cannot determine the stop position of the rotor 72. Also, the motor control unit 14 cannot determine the stop position of the rotor 72 immediately after the power of the image forming apparatus is turned on. Accordingly, when rotating the motor 15F, the motor control unit 14 performs a process of detecting the stop position of the rotor 72 at the start.

Here, typically, coils like the coils 73, 74, and 75 have a configuration in which a copper wire is wound around a core on which electromagnetic steel sheets are layered. In addition, the permeability of the electromagnetic steel sheet is reduced by an external magnetic field. The inductance of a coil is proportional to the permeability of the core, and therefore, when the permeability of the core decreases, the inductance of the coil also decreases. For example, the coil 73 of the U-phase of FIG. 4A faces only the S pole of the rotor 72, and therefore the decreasing rate of the inductance thereof is larger than that of the coil 75 of the W-phase facing both the S pole and the N pole of the rotor 72. In addition, the variation of the inductance differs depending on whether the direction of the magnetic field generated by the exciting current and the direction of the external magnetic field are the same direction or opposite directions. To be more specific, when the exciting current is fed such that the coil 73 of the U-phase is set in the same direction as the magnetic field generated by the S pole of the opposite rotor 72, or in other words, the U-phase is set to the N pole in the state of FIG. 4A, then the amount of decrease of the inductance increases more than in the case that the exciting current is supplied in the direction that sets the U-phase to the S pole. In this manner, the detected inductance differs depending on the excitation phase and the stop position of the rotor 72. In addition, when the inductance changes, the core loss of the coil changes, and accordingly, the resistance component of the coil also changes.

Figure 5A:
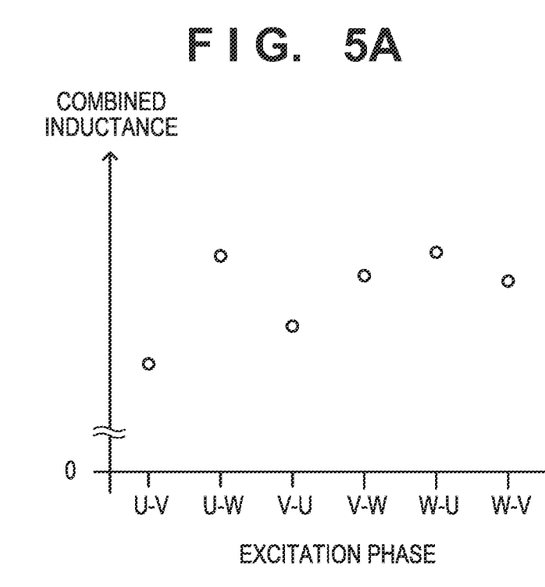
FIG. 5A illustrates a relationship between an excitation phase and a combined inductance according to an embodiment.
Figure 5B:
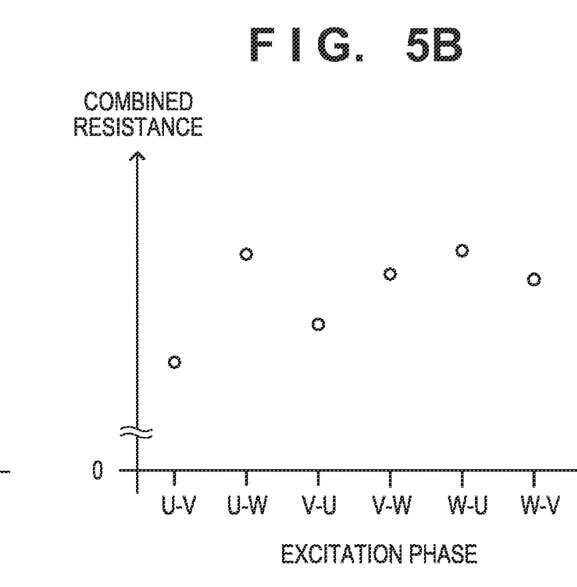
FIG. 5B illustrates a relationship between an excitation phase and a combined resistance according to an embodiment.

FIG. 5A illustrates an exemplary combined inductance of each excitation phase in the state where the rotor 72 is stopped, and FIG. 5B illustrates an exemplary combined resistance. Note that FIGS. 5A and 5B illustrate a combined inductance and a combined resistance in the case that the rotor 72 is located at a stop position of the case that the U-V phase is excited. In the following description, the position where the rotor 72 stops when the X-Y phase is excited is referred to as a "position of X-Y phase". Since the rotor 72 is stopped at the position of the U-V phase, the combined inductance and the combined resistance of the case that the U-V phase is excited is smaller than the combined inductance and the combined resistance of the case that other phases are excited. Therefore, when relative relationships of the levels of the combined impedance of the excitation phases are determined, the position of the rotor 72 can be determined. As described below, in the present embodiment, each excitation phase is excited, and the rotor stop position is detected based on the exciting current at the time of the excitation.

Figure 6A:
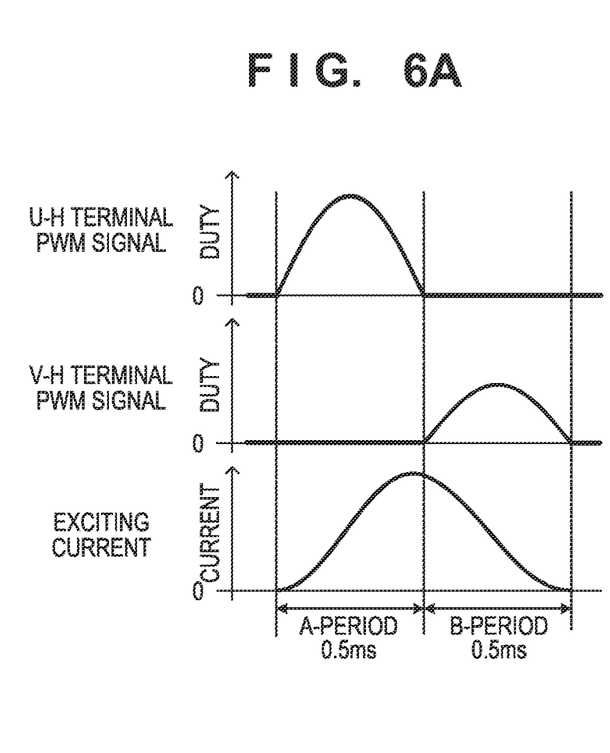
FIG. 6A illustrates an exciting current and a voltage applied to the coil according to an embodiment.

First, when the U-V phase is excited, a PWM signal whose duty varies with time as illustrated in FIG. 6A is output from the U-H terminal and the V-H terminal of the PWM port 58. To be more specific, in an A-period (first period), the duty of the PWM signal output from the U-H terminal is varied in a sine waveform. Note that the half period of the sine wave corresponds to the length of the A-period, and the maximum value of the amplitude of the sine wave is 80%, for example. Note that in the A-period, the V-L terminal is at a high level (duty 100%), and one end of the coil of the V-phase is connected with a predetermined potential (ground). Note that the other terminal is set to low (duty 0%). In the B-period (second period) succeeding the A-period, the duty of the PWM signal output from the V-H terminal is varied in a sine waveform. The half period of the sine wave is also the length of the B-period, and the maximum value of the amplitude of the sine wave is 50%, for example. Note that, in the B-period, the U-L terminal is set to a high level (duty 100%), and one end of the coil of the U-phase is connected with a predetermined potential (ground). Note that the other terminal is set to low (duty 0%). The time lengths of the A-period and the B-period are determined based on a required detection accuracy within an upper limit period in which the rotor 72 does not rotate. In this example, each time length is 0.5 ms. In addition, the maximum value of the duty in the A-period is determined such that the detection accuracy required for the exciting current that flows in the A-period is ensured. In addition, the maximum value of the duty in the B-period is set such that the time integration value of the voltage generated in the inductance component of the coil in the A-period and the B-period is substantially zero. That is, the maximum value of the duty in the B-period is determined based on the voltage applied to the coil in the A-period.

Figure 6B:
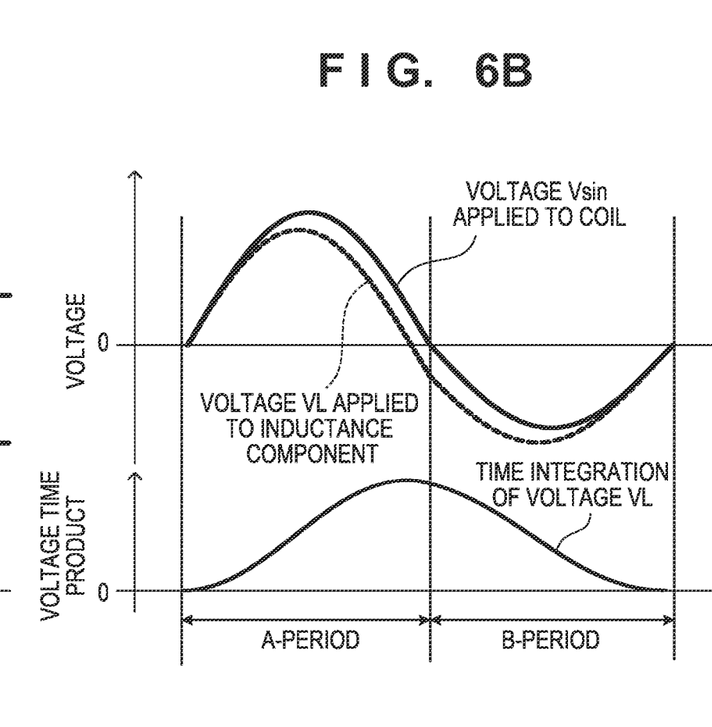
FIG. 6B illustrates a voltage applied to an inductance component and an integral waveform of the voltage according to an embodiment.

FIG. 6B illustrates a voltage VL applied to the inductance component of the coil, a waveform obtained by time integration of the waveform of the voltage VL, and a voltage V sin applied to the coil in the case that the PWM signal is varied in a sine wave form as illustrated in FIG. 6A. With a counter-electromotive voltage and/or voltage drop due to the resistance of the coil, the voltage VL is varied from the voltage V sin. The time integration waveform of the voltage VL increases when the amplitude of the voltage VL is positive, and decreases after the voltage VL becomes negative. The maximum value of the duty in the B-period is set such that the integral at the time point of completion of the B-period is equal to or smaller than a predetermined value, or is a substantially zero, for example.

With this setting, as illustrated in FIG. 6A, the exciting current smoothly decreases in the B-period, and the exciting current becomes substantially zero at the time of completion of the B-period. Thus, generation of abnormal noise due to magnetostriction can be suppressed, and the waiting time until the measurement of the next permutation of the two coils as the excitation phase can be reduced.

Figure 7:
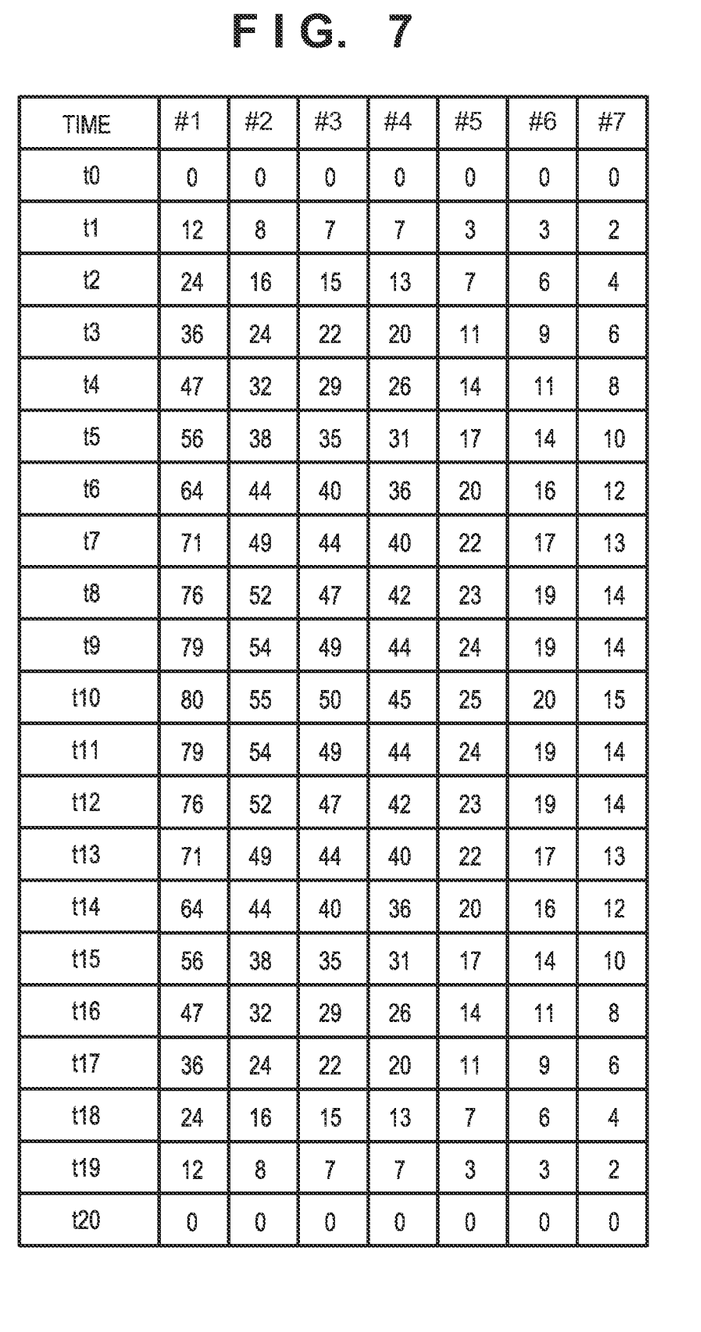
FIG. 7 illustrates a duty data according to an embodiment.

In the present embodiment, duty data representing the relationship between the duty and the time for varying the duty in a sine waveform is created in advance and stored in the nonvolatile memory 55. FIG. 7 illustrates an example of duty data. The duty data of FIG. 7 represents time-series data of seven duties, #1 to #7. Each of the A-period and the B-period is 0.5 ms, and therefore the microcomputer 51 switches the duty for each 25 μs. As illustrated in FIG. 7, the maximum value of the duty of the time-series data #1 is 80%, and the maximum value of the duty of the time-series data #3 is 50%. Accordingly, the time-series data #1 is used in the A-period, and the time-series data #3 is used in the B-period. Note that the time-series data used in the A-period and the B-period, or in other words, which of the time-series data #1 to #7 is used in the A-period and the B-period, is determined in advance in accordance with the standard parameter of the motor 15F, and stored in the nonvolatile memory 55.

Figure 8A:
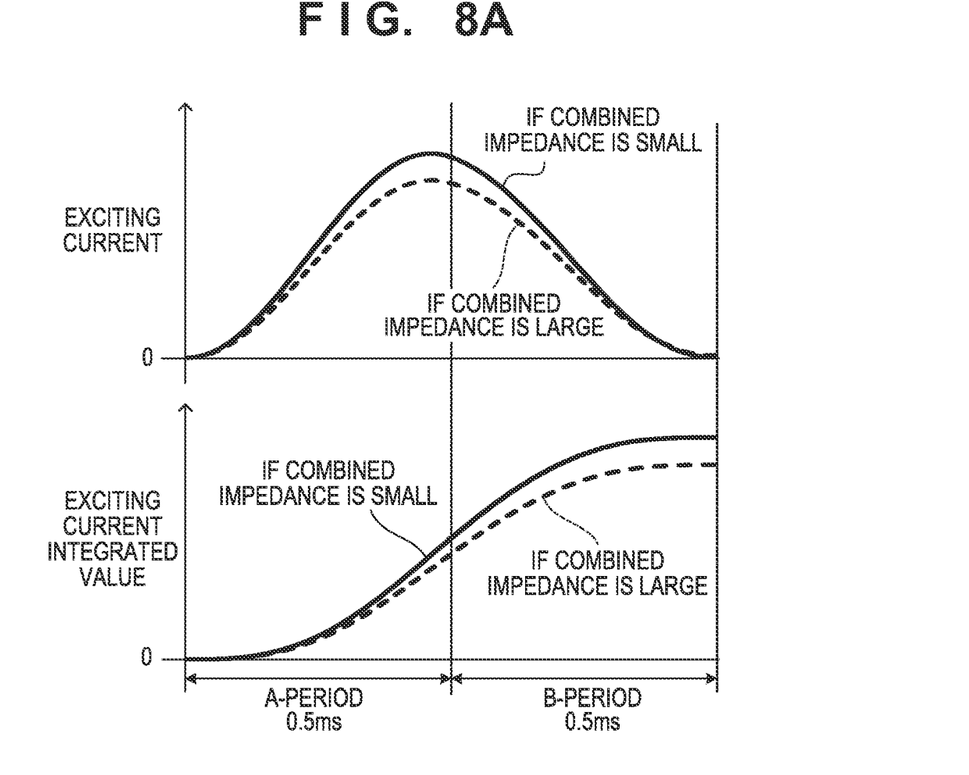
FIG. 8A illustrates an exciting current and an exciting current integrated value according to an embodiment.
Figure 8B:
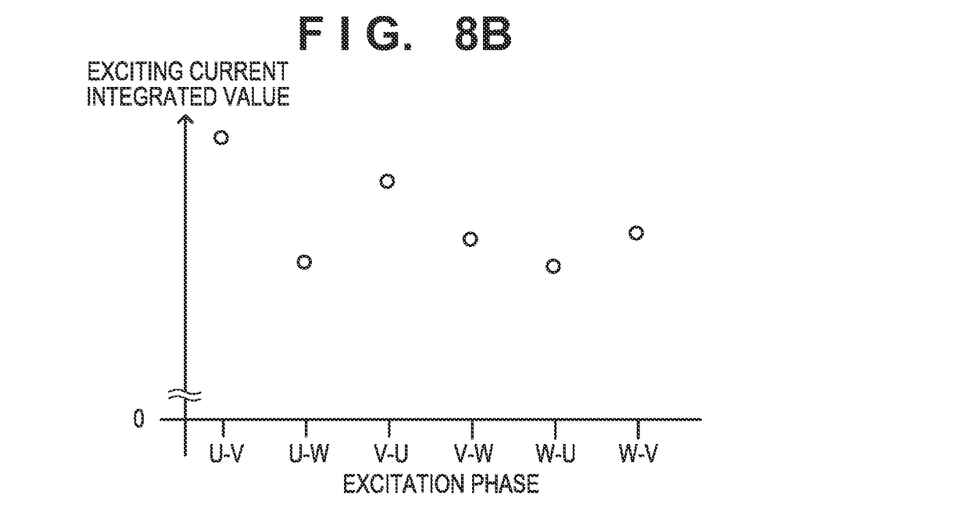
FIG. 8B illustrates a relationship between an excitation phase and an exciting current integrated value according to an embodiment.

In the A-period and the B-period, the microcomputer 51 detects the exciting current for each predetermined period of, for example, 25 μs, and performs the integrating process of the detected exciting current over the A-period and the B-period. The integrated value is stored in the memory 57. In the following description, the integrated value of the exciting current is referred to as an exciting current integrated value. FIG. 8A illustrates an exemplary exciting current and an exemplary exciting current integrated value. As illustrated in FIG. 8A, the exciting current varies depending on the value of combined impedance according to the excitation phase, and accordingly, the exciting current integrated value varies depending on the level of the combined impedance according to the excitation phase. FIG. 8B illustrates an exemplary exciting current integrated value of each excitation phase at the time point of completion of the B-period.

The exciting current waveform is determined based on the combined impedance, and therefore the relative relationship of the levels of the combined impedance of each phase can be determined based on the exciting current integrated value. In the example illustrated in FIG. 8B, the exciting current integrated value of the case that the U-V phase is excited is largest, and accordingly, it is determined that the combined impedance of the U-V phase is smallest. Thus, it is possible to determine that the rotor 72 is located at the position of the U-V phase.

Figure 9:
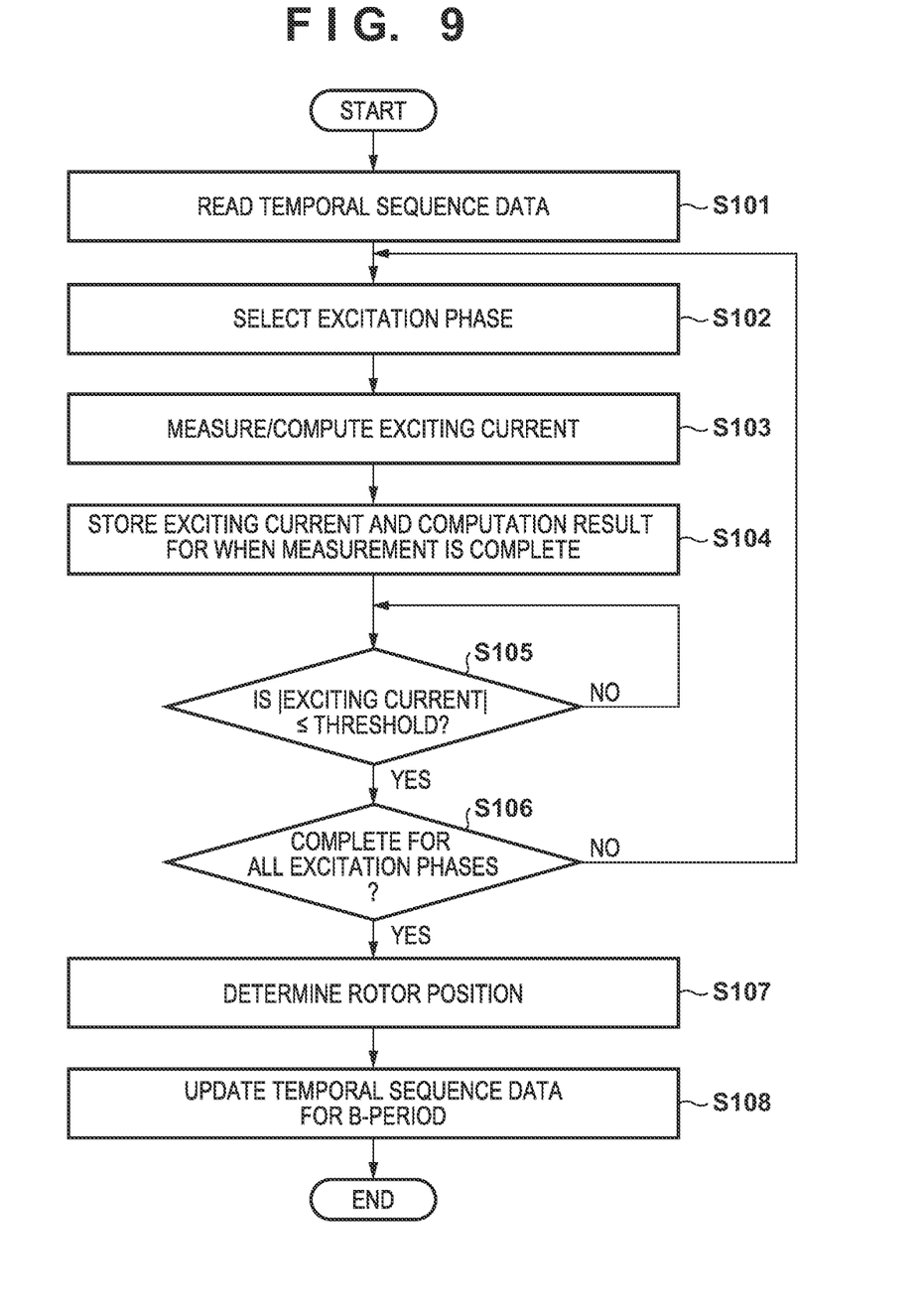
FIG. 9 is a flowchart of a process of detecting a rotor stop position according to an embodiment.

FIG. 9 is a flowchart of a process of detecting a rotor stop position executed by the motor control unit 14. At S101, the motor control unit 14 reads the time-series data of the duty to be used in the A-period and the B-period from the nonvolatile memory 55. At S102, the motor control unit 14 selects the excitation phase to be measured. At S103, the motor control unit 14 outputs a PWM signal to the selected excitation phase as described in FIG. 6A, and detects an exciting current at a predetermined timing to compute, or in other words, determine an exciting current integrated value. At the time of completion of the B-period, the motor control unit 14, at S104, stores, in the memory 57, the exciting current and the computation result, that is, the exciting current integrated value at the time point of completion of the B-period. Thereafter, at S105, the motor control unit 14 is held on standby until the absolute value of the exciting current becomes equal to or smaller than a predetermined threshold. When the absolute value of the exciting current becomes equal to or smaller than the predetermined threshold, the motor control unit 14, at S106, determines whether the measurement for all the excitation phases has been completed. When the measurement has not been completed, the process is returned to S102 and the detection process for the next excitation phase is started. When the measurement for all the excitation phases has been completed, the motor control unit 14 determines the stop position of the rotor 72 on the basis of the computation result stored in the memory 57 at S104 for each excitation phase.

Finally, at S108, the motor control unit 14 updates the number of time-series data used for the B-period. Therefore, the motor control unit 14 determines the average value of the exciting current at the time point of completion of the B-period for each excitation phase stored in the memory 57 at S104. When the average value thus obtained is a positive value (the current flows in the forward direction with respect to the excitation phase) and is greater than a first positive threshold, the motor control unit 14 changes the time-series data of the B-period such that the maximum value of the duty is increased. In this example, the time-series data #3 is used, and therefore, when the obtained average value is a positive value and is greater than the first positive threshold, the motor control unit 14 updates the time-series data used for the B-period to time-series data #2, for example. When the obtained average value is a negative value (the current flows in the direction opposite to the excitation phase) and is greater than a second negative threshold, the motor control unit 14 changes the time-series data of the B-period such that the maximum value of the duty decreases. In this example, the time-series data #3 is used, and therefore, when the obtained average value is a negative value and is greater than the second negative threshold, the motor control unit 14 updates the time-series data used for the B-period to time-series data #4, for example.

Thus, according to the present embodiment, the exciting current is smoothly attenuated so as to reduce the waiting time between a detection process of a certain excitation phase and a detection process of the next excitation phase. With this configuration, the time required for a process of detecting the rotor stop position can be shortened, and generation of abnormal noise can be suppressed. Further, by updating the time-series data used for the B-period in accordance with the detection result of the exciting current at the time of completion of the B-period, the exciting current at the time point of completion of the B-period can be dynamically controlled so as to set the current to a smaller value.

Second Embodiment

Figure 10A:
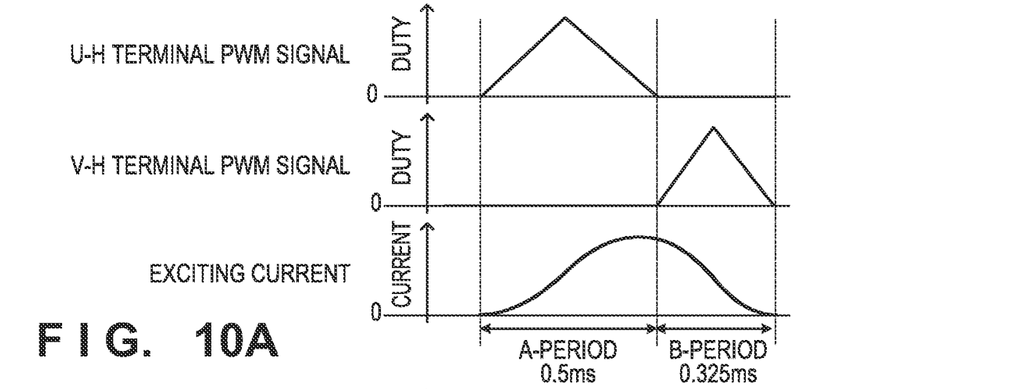
FIGS. 10A to 10C illustrate voltage application to the coil according to an embodiment.

Now, regarding a second embodiment, differences from the first embodiment are mainly described. The present embodiment differs from the first embodiment in the method of applying a voltage to the coil. FIG. 10A illustrates a time variation of a duty of a PWM signal output from the PWM port 58 when the U-V phase is excited. The A-period is 0.5 ms, and the duty of the PWM signal output to the U-H terminal is varied in a triangular waveform. Note that the maximum value of the duty is 80%, for example. Note that the voltages applied to other terminals in the A-period are identical to those of the first embodiment. In the present embodiment, the B-period is 0.325 ms, and the duty of the PWM signal output to the V-H terminal is varied in a triangular waveform. Note that the maximum value of the duty is 80%, for example. Note that the voltages applied to other terminals in the B-period are also identical to those of the first embodiment.

The time lengths of the A-period and the B-period are determined based on a required detection accuracy within an upper limit period in which the rotor 72 does not rotate. In this example, the A-period is 0.5 ms. In addition, the length of the B-period is set such that the integral of the voltage generated in the inductance component of the coil is substantially zero in the A-period and the B-period. In this example, the length of the B-period is 0.325 ms. With this setting of the length of the B-period, the exciting current smoothly decreases, and current attenuation can be expedited during the B-period. Accordingly, it is possible to set the exciting current at the time point of the completion of the B-period to substantially zero while suppressing generation of abnormal noise due to magnetostriction.

Figure 10B:
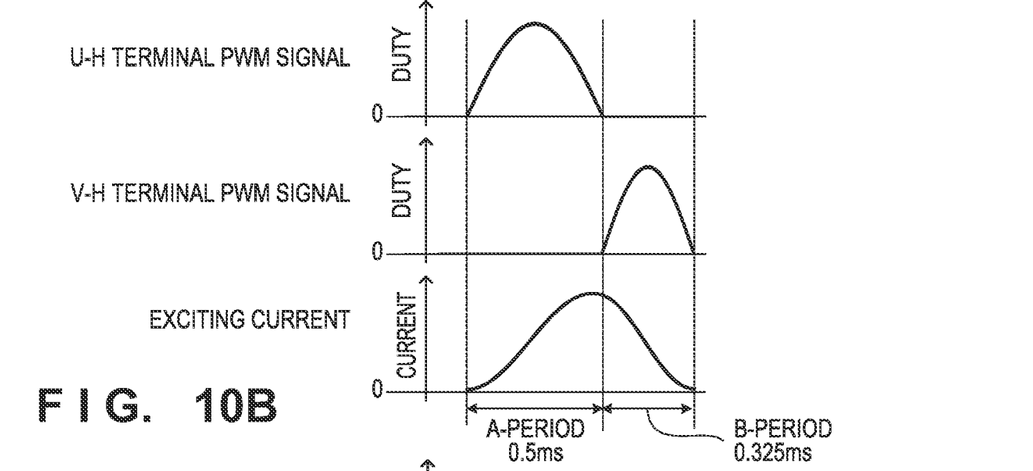
Figure 10C:
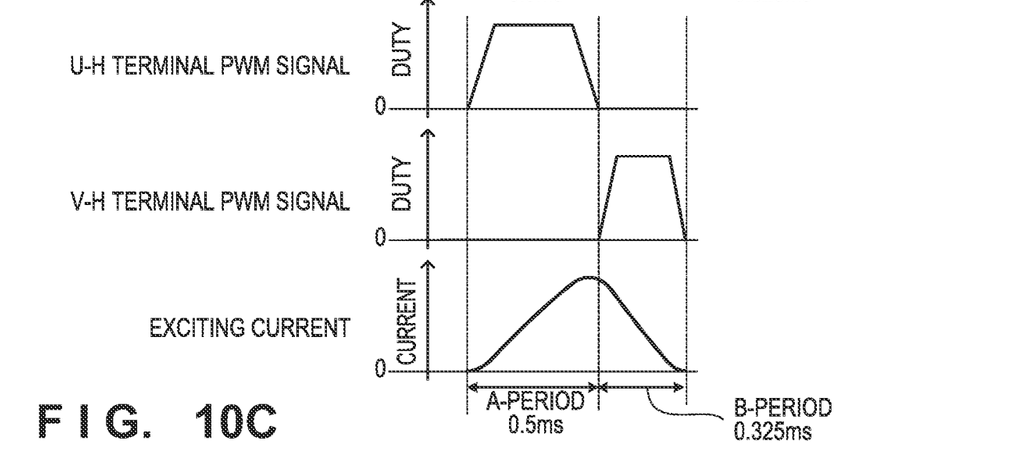

Note that the variation of the duty cycle of the PWM signal applied to the coil, or in other words, the shape of the waveform of the voltage applied to the coil, may be a sine waveform and/or a trapezoidal waveform as illustrated in FIGS. 10B and 10C. Further, the variation of the duty cycle of the PWM signal applied to the coil may be a rectangular waveform. More generally, it suffices that the shape of the waveform of the voltage applied to the coil in each period increases toward the maximum value, and, upon reaching the maximum value or after reaching the maximum value, decreases toward 0. Further, the A-period and the B-period may differ from each other in the shape of the variation of the duty cycle of the PWM signal. For example, the shape may be varied in a sine waveform in the A-period while varying the shape in a triangular wave form, a rectangular waveform or a trapezoidal waveform in the B-period, or the shape may be varied in a trapezoidal waveform in the A-period, while varying the shape in a sine waveform, a triangular waveform or a rectangular waveform in the B-period. In the present embodiment, the time-series data of the duty of the PWM signal is determined based on a predetermined computational expression. Note that the predetermined computational expression and the time-series data determined by the predetermined computational expression are stored in the nonvolatile memory 55.

Figure 11:
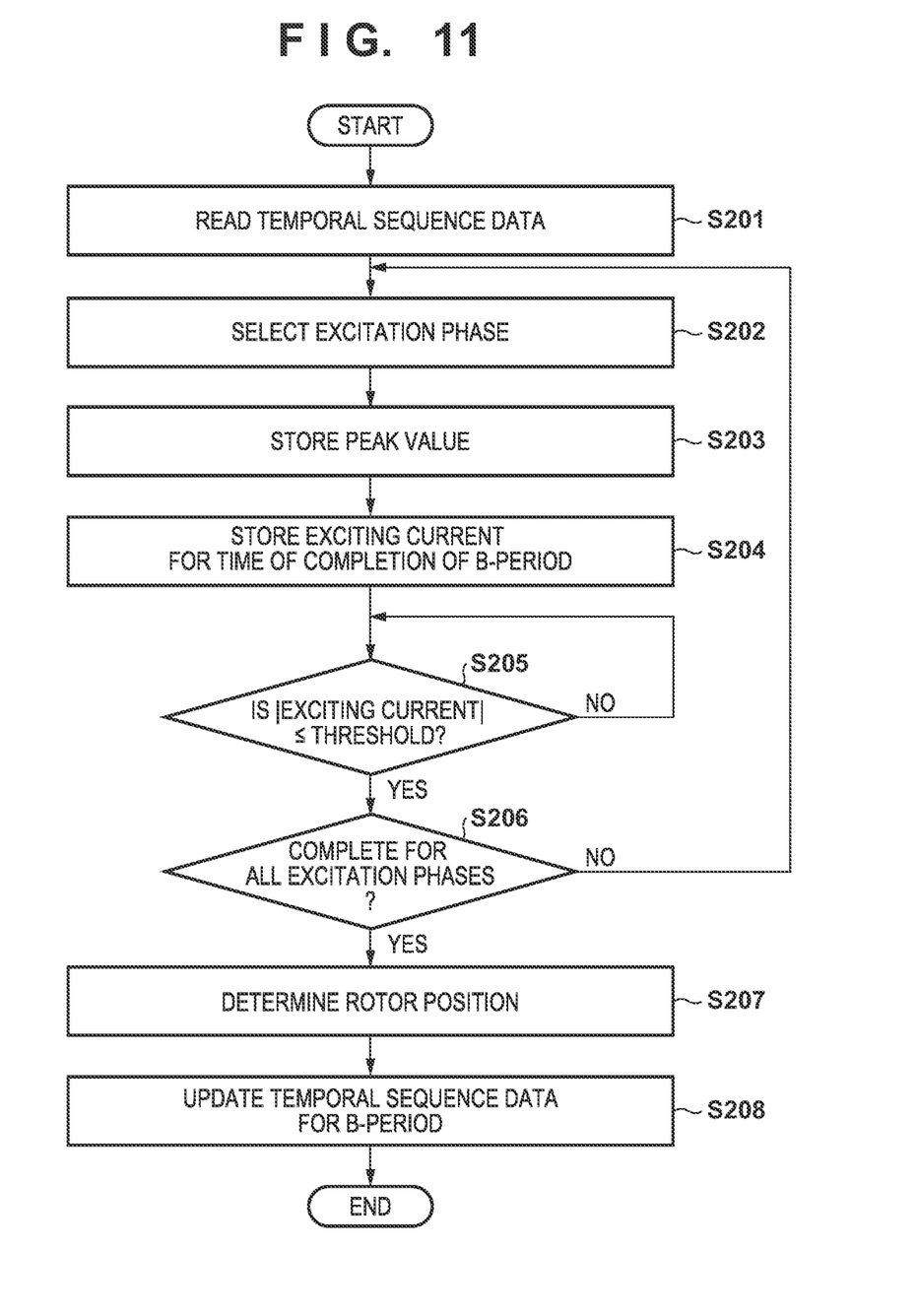
FIG. 11 is a flowchart of a process of detecting the rotor stop position according to an embodiment.

FIG. 11 is a flowchart of a process of detecting the rotor stop position according to the present embodiment. At S201, the motor control unit 14 reads the time-series data of the duty to be used in the A-period and the B-period from the nonvolatile memory 55. At S202, the motor control unit 14 selects the excitation phase to be measured. At S203, the motor control unit 14 outputs the PWM signal to the selected excitation phase as described in FIG. 10A to determine the peak value of the exciting current in the A-period and the B-period, and, at S203, the motor control unit 14 stores the peak value of the exciting current in the memory 57. Thereafter, when the B-period is completed, the motor control unit 14 stores the exciting current at the time point of completion of the B-period in the memory 57, at S204. Thereafter, at S205, the motor control unit 14 is held on standby until the absolute value of the exciting current becomes equal to or smaller than a predetermined threshold. When the absolute value of the exciting current becomes equal to or smaller than the predetermined threshold, the motor control unit 14 determines, at S206, whether the measurement for all the excitation phases has been completed. When the measurement has not been completed, the processes are repeated from S202. When the measurement for all the excitation phases has been completed, the motor control unit 14 determines the stop position of the rotor 72 on the basis of the peak value of exciting current in the A-period and the B-period stored in the memory 57 at S203 for each excitation phase. As illustrated in FIG. 8A, the level of the combined impedance can be determined on the basis of the peak value of the exciting current in the A-period.

Finally, at S208, the motor control unit 14 updates the time-series data used for the B-period. The concepts regarding the update are identical to those of the first embodiment. In the present embodiment, the time-series data is determined by a predetermined computational expression, and therefore the computational expression for determining the time-series data of the B-period, and the coefficient of the computational expression are changed. The computational expression and/or the coefficient after the change is stored in the nonvolatile memory 55. In addition, the time-series data used for the B-period in the succeeding measurement is updated on the basis of the computational expression or the coefficient after the change, and the updated time-series data is also stored in the nonvolatile memory 55. Note that a PWM signal may be output on the basis of the computational expression instead of preliminarily determining the time-series data and storing the time-series data in the nonvolatile memory 55. Further, the length of the B-period may be changed instead of changing the maximum value of the duty in the B-period. In this case, when the average value of the exciting current at the time of completion of the B-period is a positive value and is greater than the first positive threshold, the motor control unit 14 increases the length of the B-period. When the average value of the exciting current at the time of completion of the B-period is a negative value and is greater than the second negative threshold, the motor control unit 14 reduces the length of the B-period. Note that, the detection of the peak value in the A-period and the B-period may be achieved by a configuration in which the exciting current is measured for each predetermined period to determine the peak value, or a configuration in which the timing at which the exciting current reaches the peak value is determined in advance to measure the exciting current at or about that timing.

As described above, in the present embodiment, the B-period is shorter than the A-period, and thus, the current can be smoothly attenuated in a short time. With this configuration, the time required for a process of detecting the rotor stop position can be shortened, and generation of abnormal noise can be suppressed.

Other Embodiments

Note that the motor control unit 14 may be mounted as a motor control apparatus. In addition, the parts for the motor control of the motor control unit 14 and the printer control unit 11 may be mounted as a motor control apparatus. Further, while an exemplary control of the motor 15F for driving the fixing unit 24 is described in the present embodiment, the present invention is applicable to a motor for driving each roller for sheet conveyance in the image forming apparatus, for example. Also, the present invention is applicable to a motor for driving a member in the image forming unit 1 of the image forming apparatus.

Figure 12:
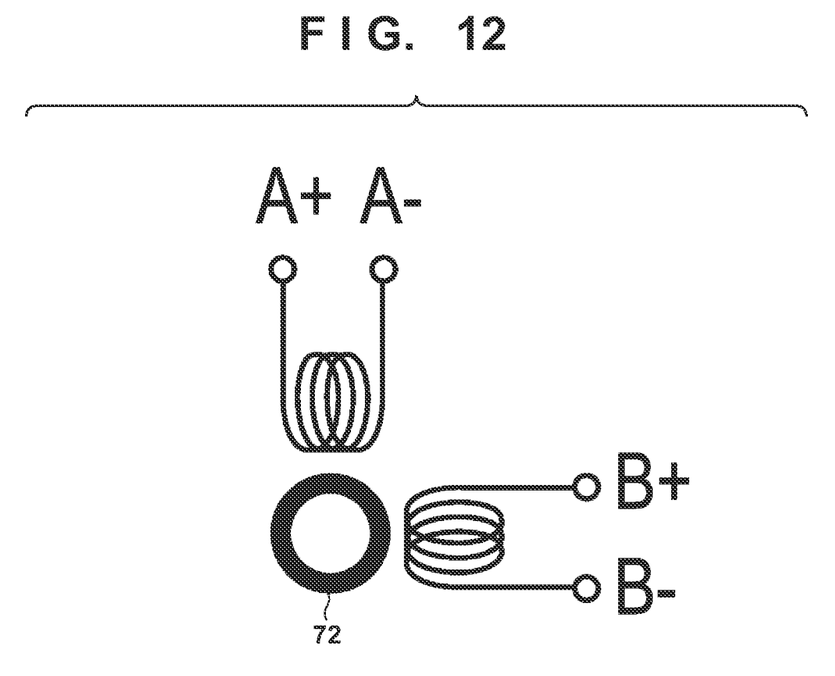
FIG. 12 illustrates a configuration of a stepping motor according to an embodiment.

The embodiments are described above with an exemplary motor including star-connected coils of three phases as illustrated in FIG. 3. However, the present invention is applicable to a motor using a Δ connection and/or a stepping motor illustrated in FIG. 12. As illustrated in FIG. 12, a stepping motor includes the rotor 72 and two coils, a coil A and a coil B. The coil A includes connecting terminals A+ and A−, and the coil B includes connecting terminals B+ and B−. Supply of an exciting current from the connecting terminal A+ to the connecting terminal A− is referred to as "A-phase excitation", and supply of an exciting current from the connecting terminal A− to the connecting terminal A+ is referred to as "/A-phase excitation". Likewise, supply of an exciting current from the connecting terminal B+ to the connecting terminal B− is referred to as "B phase excitation", and supply of an exciting current from the connecting terminal B− to the connecting terminal B+ is referred to as "/B phase excitation". Also in this case, the motor control unit 14 sequentially performs a detection process on the four excitation phases, namely, the A phase, the /A phase, the B phase, and the /B phase, to detect the rotor stop position.

To be more specific, in the case that the A phase is excited in the detection process, the connecting terminal A− is connected to the ground and the voltage of the connecting terminal A+ is varied in the A-period, for example. In the B-period, the connecting terminal A+ is connected to the ground and the voltage of the connecting terminal A− is varied, for example. In other words, in the case of the A-phase excitation, a positive voltage is applied to the coil A for the excitation phase in the A-period, and a negative voltage is applied to the coil A for the excitation phase in the B-period. That is, the polarity of the voltage applied to the coil A in the A-period and the polarity of the voltage applied to the coil A in the B-period are different from each other. Note that the same applies to the case that a permutation of two coils is the excitation phase as described in the embodiment. In addition, in the case that the excitation phase is one coil, the rotor stop position is determined based on the impedance of the coil.

In addition, the concepts regarding the update of the voltage waveform in the B-period are similar to those of the embodiments. For example, in the case of the A-phase excitation, a positive (first polarity) voltage, with respect to the connecting terminal A−, is applied to the connecting terminal A+ in the A-period. Note that, in the B-period, a positive voltage, with respect to the connecting terminal A+, is applied to the connecting terminal A−, and accordingly, a negative (second polarity) voltage is applied to the connecting terminal A+ with respect to the connecting terminal A−. Here, when an exciting current greater than a first threshold flows in the forward direction with respect to the first polarity at the time of completion of the B-period, the exciting current at the time of completion of the B-period can be set to a value closer to 0 by increasing the duty of the PWM signal in the B-period, or by lengthening the B-period. For example, in the case of the A-phase excitation, when an exciting current greater than the first threshold flows in the direction from the connecting terminal A+ to the connecting terminal A− at the time of completion of the B-period, the exciting current at the time of completion of the B-period can be set to a value closer to 0 by increasing the duty of the PWM signal, or by lengthening the B-period. Likewise, when an exciting current greater than a second threshold flows in the direction opposite to the first polarity at the time of completion of the B-period, the exciting current at the time of completion of the B-period can be set to a value closer to 0 by reducing the duty of the PWM signal in the B-period, or by shortening the B-period. For example, in the case of the A-phase excitation, when an exciting current greater than the second threshold flows in the direction from the connecting terminal A− to the connecting terminal A+ at the time of completion of the B-period, the exciting current at the time of completion of the B-period can be set to a value closer to 0 by reducing the duty of the PWM signal, or by shortening the B-period.

In the embodiment, after the detection process has been performed on all the excitation phases, the waveform of the voltage applied in the B-period or the length of the B-period is updated based on the average value of the exciting current at the time of completion of the B-period of all the excitation phases. However, the voltage waveform applied in the B-period or the length of the B-period may be updated based on the average value of the exciting current at the time of completion of the B-period of some of the excitation phases, and/or the exciting current at the time of completion of the B-period of one excitation phase.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-094754, filed on May 16, 2018, which is hereby incorporated by reference herein in its entirety.

What is claimed is:

1. A motor control apparatus comprising:
a voltage control unit configured to control a voltage applied to a plurality of coils included in a motor to supply an exciting current to the plurality of coils;
a current detection unit configured to detect an exciting current having flown through the plurality of coils; and
a detection unit configured to detect a stop position of a rotor of the motor by performing a detection process, in which the exciting current to at least a first coil of the plurality of coils is supplied by the voltage control unit, and the exciting current is detected by the current detection unit,
wherein the detection process includes a first period in which a first voltage of a first polarity is applied to the first coil, and a second period in which a second voltage of a second polarity is applied to the first coil, and
wherein at least one of a voltage waveform of the second voltage or a length of the second period is determined based on a voltage waveform of the first voltage.

2. The motor control apparatus according to claim 1, wherein the first polarity and the second polarity are different from each other.

3. The motor control apparatus according to claim 1, wherein the voltage control unit updates a voltage waveform of the second voltage or a length of the second period on a basis of a detection result of the current detection unit at a time of completion of the second period.

4. The motor control apparatus according to claim 3, wherein
the voltage control unit controls a voltage applied to each of the plurality of coils by controlling switching elements respectively corresponding to the plurality of coils by a pulse-width modulation signal, and
the voltage control unit varies a duty of the pulse-width modulation signal in a sine waveform, a triangular waveform, or a trapezoidal waveform in each of the first period and the second period.

5. The motor control apparatus according to claim 4, wherein
when the detection result of the current detection unit at the time of completion of the second period indicates a flow of the exciting current greater than a first threshold in a forward direction with respect to the first polarity, the voltage control unit updates the voltage waveform in the second period by increasing a maximum value of the duty of the pulse-width modulation signal in the second period, and
when the detection result of the current detection unit at the time of completion of the second period indicates a flow of the exciting current greater than a second threshold in a direction opposite to the first polarity, the voltage control unit updates the voltage waveform in the second period by reducing the maximum value of the duty of the pulse-width modulation signal in the second period.

6. The motor control apparatus according to claim 4, wherein
when the detection result of the current detection unit at the time of completion of the second period indicates a flow of the exciting current greater than a first threshold in a forward direction with respect to the first polarity, the voltage control unit updates the length of the second period such that the length of the second period increases, and
when the detection result of the current detection unit at the time of completion of the second period indicates a flow of the exciting current greater than a second threshold in a direction opposite to the first polarity, the voltage control unit updates the length of the second period such that the length of the second period decreases.

7. The motor control apparatus according to claim 1, wherein
the voltage control unit supplies the exciting current from the first coil to a second coil of the plurality of coils in the detection process,
the detection unit performs the detection process for each of two permutations of the plurality of coils to detect the stop position of the rotor,
the voltage control unit controls a voltage applied to the first coil while setting the second coil to a predetermined potential in the first period,
the voltage control unit controls a voltage applied to the second coil while setting the first coil to the predetermined potential in the second period, and
a voltage waveform applied to the second coil by the voltage control unit in the second period, or a length of the second period is determined based on a voltage waveform applied to the first coil by the voltage control unit in the first period.

8. The motor control apparatus according to claim 7, wherein
the voltage control unit controls a voltage applied to each of the plurality of coils by controlling switching elements respectively corresponding to the plurality of coils by a pulse-width modulation signal, and
the voltage control unit varies a duty of the pulse-width modulation signal in a sine waveform, a triangular waveform, or a trapezoidal waveform in each of the first period and the second period.

9. The motor control apparatus according to claim 8, wherein the voltage control unit updates the voltage waveform applied to the second coil in the second period or the length of the second period on a basis of a detection result of the current detection unit at a time of completion of the second period.

10. The motor control apparatus according to claim 9, wherein the detection result of the current detection unit at the time of completion of the second period is an average value of the exciting current detected by the current detection unit at the time of completion of the second period of the detection process performed for each of two permutations of the plurality of coils.

11. The motor control apparatus according to claim 9, wherein
when the detection result of the current detection unit at the time of completion of the second period indicates a flow of the exciting current greater than a first threshold in a direction from the first coil to the second coil, the voltage control unit updates a voltage waveform in the second period by increasing a maximum value of the duty of the pulse-width modulation signal in the second period, and
when the detection result of the current detection unit at the time of completion of the second period indicates a flow of the exciting current greater than a second threshold in a direction from the second coil to the first coil, the voltage control unit updates the voltage waveform in the second period by reducing the maximum value of the duty of the pulse-width modulation signal in the second period.

12. The motor control apparatus according to claim 9, wherein
the detection result of the current detection unit at the time of completion of the second period indicates a flow of the exciting current greater than a first threshold in a direction from the first coil to the second coil, the voltage control unit updates the length of the second period such that the length of the second period increases, and
when the detection result of the current detection unit at the time of completion of the second period indicates a flow of the exciting current greater than a second threshold in a direction from the second coil to the first coil, the voltage control unit updates the length of the second period such that the length of the second period decreases.

13. The motor control apparatus according to claim 1, wherein the detection unit detects the stop position of the rotor on a basis of an impedance determined based on a detection result of the current detection unit in the detection process.

14. The motor control apparatus according to claim 1, wherein the detection unit detects the stop position of the rotor by a process of integrating the exciting current over the first period and the second period.

15. The motor control apparatus according to claim 1, wherein the detection unit detects the stop position of the rotor on a basis of a peak value of the exciting current in the first period and the second period.

16. The motor control apparatus according to claim 1, wherein
a voltage waveform in the second period, or a length of the second period is determined such that an integral of a voltage applied to an inductance of a coil in which the exciting current flows over the first period and the second period is equal to or smaller than a predetermined value, and
a voltage waveform in the first period is determined based on an accuracy required for the detection process.

17. The motor control apparatus according to claim 1, wherein when an absolute value of the exciting current at a time when the detection process is completed is greater than a third threshold, the detection unit is held on standby until the exciting current becomes equal to or smaller than the third threshold before starting a next detection process.

18. The motor control apparatus according to claim 1, wherein the second period is shorter than the first period.

19. An image forming apparatus comprising:
a rotation member configured to convey a sheet along a conveyance path;
an image forming unit configured to form an image on the sheet conveyed along the conveyance path;
a motor configured to drive the rotation member or the image forming unit; and
a motor control unit configured to control the motor,
wherein the motor control unit includes:
a voltage control unit configured to control a voltage applied to a plurality of coils included in a motor to supply an exciting current to the plurality of coils;
a current detection unit configured to detect an exciting current having flown through the plurality of coils; and
a detection unit configured to detect a stop position of a rotor of the motor by performing a detection process, in which the exciting current to at least a first coil of the plurality of coils is supplied by the voltage control unit, and the exciting current is detected by the current detection unit,
wherein the detection process includes a first period in which a first voltage of a first polarity is applied to the first coil, and a second period in which a second voltage of a second polarity is applied to the first coil, and
wherein at least one of a voltage waveform of the second voltage or a length of the second period is determined based on a voltage waveform of the first voltage.

* * * * *